United States Patent [19]

Ishiwa et al.

[11] Patent Number: 5,484,874
[45] Date of Patent: Jan. 16, 1996

[54] POLYCARBONATE RESIN COMPOSITIONS

[75] Inventors: Kenichi Ishiwa, Shimotsuga; Hideyuki Itoi, Utsunomiya, both of Japan

[73] Assignee: GE Plastics, Japan, Ltd., Tokyo, Japan

[21] Appl. No.: 33,938

[22] Filed: Mar. 19, 1993

[51] Int. Cl.$^6$ .................................................. C08G 64/00
[52] U.S. Cl. ........................................... 528/196; 528/198
[58] Field of Search ....................................... 528/196, 198

[56] References Cited

U.S. PATENT DOCUMENTS 4,757,104   7/1988   Nace ......................................... 524/211

FOREIGN PATENT DOCUMENTS 0435124   3/1991   European Pat. Off. .
2356698   1/1978   France .

OTHER PUBLICATIONS

Database WPI Week 9006, Derwent Publications Ltd., London, GB; An 90–039861 & JP-A-1 315 459 (Mtisubishi Gas Chem KK) 16 Jun. 1988 *abstract*.

Primary Examiner—James J. Seidleck
Assistant Examiner—Terressa M. Mosley

[57] ABSTRACT

Polycarbonate resin compositions and methods for their preparation are disclosed. The disclosed compositions are comprised of polycarbonate resins and esters of aliphatic carboxylic acids and alcohols and exhibit good mold release and thermal stability while experiencing little discoloration during molding.

10 Claims, No Drawings

POLYCARBONATE RESIN COMPOSITIONS

The present invention relates to polycarbonate resin conditions, specifically to polycarbonate resin compositions having good mold release and thermal stability.

BACKGROUND OF THE INVENTION

Polycarbonates are usually manufactured by the phosgene process, but polycarbonates obtained in this way have the drawbacks of unsatisfactory thermal stability, and of poor mold release which complicates the continuous production of molded products from such polycarbonates.

In order to improve the mold release characteristics of polycarbonates, aliphatic ester are sometimes mixed with them as mold release agents. But although the addition of aliphatic esters makes for better mold release, the resin compositions thus obtained have inferior thermal stability, which can cause problems such as mold fouling during continuous production of molded products.

Those problems are solved by the present invention, whose object is to provide polycarbonate resin compositions having good mold release and thermal stability, with minimal mold fouling.

SUMMARY OF THE INVENTION

The present invention consists of polycarbonate resin compositions containing
A) 100 wt. parts polycarbonates and
B) 0.001~5 wt. parts esters of aliphatic carboxylic acids and alcohols,
in which the polycarbonates are products of melt polymerization of aromatic dihydroxy compounds with carbonate diesters.

These polycarbonate resin compositions have extremely good mold release. They also show very little discoloration during molding. In addition, they have good thermal stability, so there is little fouling of molds in continuous production, and little lowering of melt viscosity during molding. These effects of the present invention are a dramatic improvement over those observed when polycarbonates made by the conventional phosgene process are used, or when common mold release agents are added. It is this combination of polycarbonates and mold release agents in accordance with the present invention that makes possible the effect of the invention.

These polycarbonate resin compositions are particularly suitable for use in optical applications, such as optical disks, lenses, optical fibers, lighting fixtures, etc.

The first essential condition of the present invention is the use of polycarbonates which are products of melt polymerization of aromatic dihydroxy compounds with carbonate diesters. As shown by the comparisons below, such an effect cannot be achieved when ordinary polycarbonates obtained by the phosgene process are used, even with added esters. On the other hand, using polycarbonates which are products of melt polymerization of aromatic dihydroxy compounds with carbonate diesters, in accordance with the present invention, the characteristics discussed above can be dramatically improved by addition of the esters. This is something completely unforeseen.

The products of melt polymerization of aromatic dihydroxy compounds with carbonate diesters referred to here include all polycarbonates obtained by a melt process using aromatic dihydroxy compounds and carbonate diesters as the starting materials. The melt process itself is a known method of synthesizing polycarbonates by a transesterification reaction between dihydroxy compounds and carbonate diesters in their molten state.

There is no particular restriction on the aromatic dihydroxy compounds; any of the various types of known compounds can be used. Examples include, but are not limited to, compounds represented by the formula

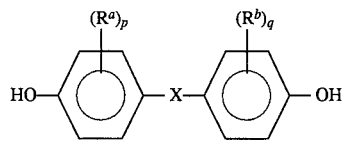

(where $R^a$ and $R^b$ are each independently a halogen or a monovalent hydrocarbyl group; X is $-C(R^c)(R^d)-$, $-C(=R^e)-$, $-O-$, $-S-$, or $-SO_2-$, $R^c$ $R^d$ are each independently a hydrogen atom or a monovalent hydrocarbyl group; $R^f$ is a divalent hydrocarbyl group; and p and q are each independently an integer 0–4), such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-1-methylphenyl)propane, 1,1-bis(4-hydroxy-tert-butylphenyl)propane, 2,2-bis(4-hydroxy-3-bromophenyl)propane, and other bis(hydroxyaryl) alkanes; 1,1-bis(4-hydroxyphenyl)cyclophentane, 1,1-bis(4-hydroxyphenyl)cyclohexane, and other bis(hydroxyaryl)cycloalkanes; 4,4'-dihydroxydiphenyl ether, 4,4'-dihydroxy-3,3'-dimethylphenyl ether, and other dihydroxyaryl ethers; 4,4'-dihydroxydiphenyl sulfide, 4,4'-dihydroxy-3,3'-dimethylphenyl sulfide, and other dihydroxyaryl sulfides; 4,4'-dihydroxydiphenyl sulfoxide, 4,4'-dihydroxy-3,3'-dimethylphenyl sulfoxide, and other dihydroxyaryl sulfoxides; and 4,4'-dihydroxydiphenyl sulfone, 4,4'-dihydroxy-3,3'-dimethylphenyl sulfone, and other dihydroxyaryl sulfones. Of these, 2,2-bis(4-hydroxyphenyl) propane is preferably used. Other aromatic dihydroxy compounds which can be used include compounds represented by the following general formula

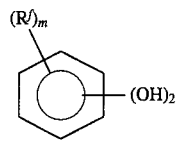

(where each R' is independently a hydrocarbyl group having 1–10 carbons, a halogenated hydrocarbyl group having 1–10 carbons, or a halogen atom, and m is an integer 0–4), such as resorcin, 3-methylresorcin, 3-ethylresorcin, 3-propylresorcin, 3-butylresorcin, 3-tert-butylresorcin, 3-phenylresorcin, 3-cumylresorcin, 2,3,4,6-tetrafluororesorcin, 2,3,4,6-tetrabromoresorcin, and other substituted resorcins; catechol; hydroquinone, 3-methylhydroquinone, 3-ethylhydroquinone, 3-propylhydroquinone, 3-butylhydroquinone, 3-tert-butylhydroquinone, 3-phenylhydroquinone, 3-cumyulhydroquinone, 2,3,5,6-tetramethylhydroquinone, 2,3,5,6-tetra-tert-butylhydroquinone, 2,3,5,6-tetrafluorohydroquinone, 2,3,5,6-tetrabromohydroquinone, and other substituted hydroquinones; as well as 2,2,2',2'-tetrahydro-3, 3,3',3'-tetramethyl-1,1'-spirobi-[ 1H-indenel]-7,7'-diol represented by the following formula.

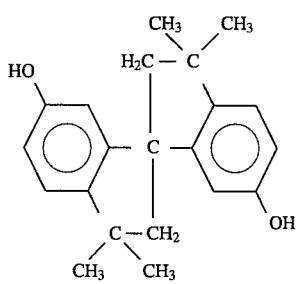

These aromatic dihydroxy compounds may be used singly or in combinations of two or more.

There is no particular restriction on the carbonate diesters, either. Examples include, but are not limited to, diphenyl carbonate, ditolyl carbonate, bis-(chlorophenyl) carbonate, m-cresyl carbonate, dinaphthyl carbonate, bis(diphenyl) carbonate, diethyl carbonate, dimethyl carbonate, dibutyl carbonate, dicyclohexyl carbonate, etc. Diphenyl carbonate is preferably used.

These carbonate esters may be used singly or in combinations of two or more.

These carbonate diesters may also contain dicarboxylic acids or dicarbonxylate esters. Examples of dicarboxylic acids and dicarboxylate esters include aromatic dicarboxylic acids and their derivatives, such as terephthalic acid, isophthalic acid, diphenyl terephthalate, diphenyl iosphthaliate, etc.; aliphatic dicarboxylic acids and their derivatives, such as succinic acid, glutaric acid, adipic acid, pimelic acid, suberic acid, azelaic acid, sebacic acid, decanedioic acid, dodecanedioic acid, diphenyl sebacate, diphenyl decanedioate, diphenyl dodecanedioate, etc.; and alicyclic dicarboxylic acids and their derivatives, such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclopentanedicarboxylate, diphenyl 1,4-cyclohexanedicarboxylate, etc. These dicarboxylic acids and dicarboxylate esters may be used singly or in combinations of two or more. The carbonate diesters preferably contain no more than 50 mole %, more preferably no more than 30 mole %, of such dicarboxylic acids and dicarboxylate esters.

In the manufacture of the polycarbonates, in addition to the aromatic dihydroxy compounds and carbonate diesters, one can also use polyfunctional compounds having three or more functional groups per molecule. Such polyfunctional compounds are preferably compounds having phenolic hydroxy groups or carboxy groups; those having 3 phenolic hydroxy groups are particularly preferred. Examples of such preferred compounds include 1,1,1-tris(4-hydroxyphenyl)ethane, 2,2',2"-tris(4-hydroxyphenyl)diisopropylbenzene [sic], α-methyl-α,α',α'-tris(4-hydroxyphenyl)-1,4-diethylbenzene, α,α',α"-tris-(4-hydroxyphenyl)-1,3,5-trisopropylbenzene, phloroglucin, 4,6-dimethyl-2,4,6-tri(4-hydroxyphenyl)heptane-2, 1,3,5-tri(4-hydroxyphenyl)benzene, 2,2-bis[4,4-(4,4'-dihydroxyphenyl)cyclohexyl]propane, trimellitic acid, 1,3,5-benzenetricarboxylic acid, pyromellitic acid, etc. Particularly preferred are 1,1,1-tris(4-hydroxyphenyl)ethane, α,α',α"-tris(4-hydroxyphenyl)-1,3,5-tri-isopropylbenzene, etc. The polyfunctional compounds are preferably used in amounts of up to 0.03 mole, more preferably 0.001~0.02 mole, most preferably 0.001~0.01 mole, per mole of aromatic dihydroxy compounds.

Compounds which form one or more terminal groups represented by the formula

HO—, (1)

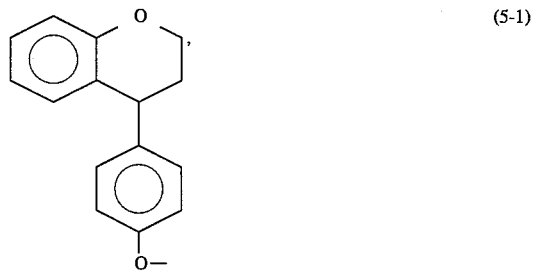

(where the aromatic ring or the chromanyl group may be substituted with halogens or alkyl groups having 1–9 carbons) can also be used in the manufacture of polycarbonates. Compounds capable of introducing hydroxyl groups (1) include diols such as bisphenol A. Compounds capable of introducing phenoxy groups (2) include phenol, diphenyl carbonate, etc. Compounds capable of introducing p-tert-butylphenoxy groups (3) include p-tert-butylphenol, p-tert-butylphenyl phenyl carbonate, p-tert-butylphenyl carbonate, etc. Compounds capable of introducing p-cumylphenoxy groups (p-phenylisopropylphenoxy groups) (4) include p-cumyl-phenol, p-cumylphenyl, phenyl carbonate, p-cumylphenyl carbonate, etc. Chromanylpenoxy groups (5) of the type indicated in the formula include those having the following formulas.

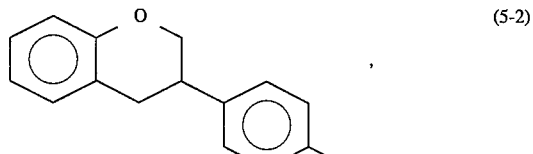

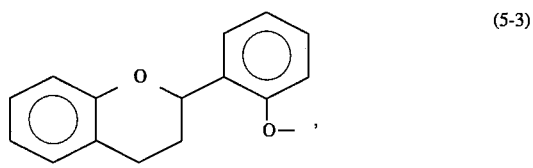

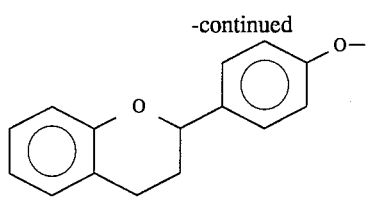
(5-4)

Compounds capable of introducing groups represented by (5-1) include 2,2,4-trimethyl-4-(4-hydroxyphenyl)chroman, 2,2,4,6-tetramethyl-4-(3,5-dimethyl-4-hydroxyphenyl)chroman, 2,3,4-trimethyl-2-ethyl-4-(3-nonyl-4-hydroxyphenyl-7-nonylchroman, 2,2,4-trimethyl-4-(3,5-diethyl-4-hydroxyphenyl)-6-ethylchroman, 2,2,4,6,8-pentamethyl-4-(3,5-dimethyl-4-hydroxyphenyl)chroman, 2,2,4-triethyl-3-methyl-4-(4-hydroxyphenyl)chroman, 2,2,4-trimethyl-4-(3-bromo-4-hydroxyphenyl)-6-bromochroman, 2,2,4-trimethyl-4-(3,5-dibromo-4-hydroxyphenyl)-6-bromochroman, 2,2,4-trimethyl-4-(3,5-dibromo-4-hydroxyphenyl)-6,8-dibromochroman, etc. Of these, 2,2,4-trimethyl-4-(4-hydroxyphenyl)chroman is particularly preferred. Compounds capable of introducing groups represented by (5-2) include 2,2,3-trimethyl-3-(4-hydroxyphenyl)chroman, 2,2,3,6-tetramethyl-3-(3,5-dimethyl-4-hydroxyphenyl)chroman, 2,3,4-trimethyl-2-ethyl-3-(3-nonyl-4-hydroxyphenyl)-7-nonylchroman, 2,2,3-trimethyl-3-(3,5-diethyl-4-hydroxyphenyl)-6-ethylchroman, 2,2,3-6,8-pentamethyl-3-(3,5-dimethyl-4-hydroxyphenyl)chroman, 2,2,3-triethyl-3-methyl-3-(4-hydroxyphenyl)chroman, 2,2,3-trimethyl-3-(3-bromo-4-hydroxyphenyl)-6-bromochroman, 2,2,3-trimethyl-3-(3,5-dibromo-4-hydroxyphenyl)-6-bromochroman, 2,2,3-trimethyl-3-(3,5-dibromo-4-hydroxyphenyl)-6,8-dibromochroman, etc. Of these, 2,2,3-trimethyl-3-(4-hydroyphenyl)chroman is particularly preferred. Compounds capable of introducing groups represented by (5-3) include 2,4,4-trimethyl-2-(2-hydroxyphenyl)chroman, 2,4,4,6-tetramethyl-2-(3,5-dimethyl-2-hydroxyphenyl)chroman, 2,3,4-trimethyl-4-ethyl-2-(3,5-dimethyl-2-hydroxyphenyl)-7-nonylchroman, 2,4,4-trimethyl-2-(3,5-dimethyl-2-hydroxyphenyl)-6-ethylchroman, 2,4,4,6,8-pentamethyl-2-(3,5-dimethyl-2-hydroxyphenyl)-6-ethylchroman, 2,4,4-trimethyl-2-(3-bromo-2-hydroxyphenyl)chroman, 2,4,4-trimethyl-2-(3-bromo-2-hydroxyphenyl)-6-bromochroman, 2,4,4-trimethyl-2-(3,5-dibromo-2-hydroxyphenyl)-6-bromochroman, 2,4,4-trimethyl-2-(3,5 -dibromo-2-hydroxyphenyl)-6,8-dibromochroman, etc. Of these, 2,2,4-trimethyl-2-(2-hydroxyphenyl)chroman [sic] is particularly preferred. Compounds capable of introducing groups represented by (5-4) include 2,4,4-trimethyl-2-(4-hydroxyphenyl)chroman, 2,4,4,6-tetramethyl-2-(3,5-dimethyl-4-hydroyphenyl)chroman, 2,4,4-triethyl-2-(4-hydroxyphenyl)chroman, 2,3,4-trimethyl-4-ethyl-2-(3,5-dimethyl-4-hydroxyphenyl)-7-nonylchroman, 2,4,4-trimethyl-2-(3,5-diethyl-4-hydroxyphenyl)-6-ethylchroman, 2,4,4,6,8-pentamethyl-2-(3,5-dimethyl-4-hydroxyphenyl)-6-ethylchroman, 2,4,4-trimethyl-2(3-bromo-4-hydroxyphenyl)chroman, 2,4,4-trimethyl-2-(3-bromo-4-hydroxylphenyl)-6-bromochroman, 2,4,4-trimethyl-2-(3,5-dibromo-4-hydroxyphenyl)-6-bromochroman, 2,4,4 -trimethyl-2-(3,5-dibromo-22-hydroxyphenyl)-6,8-dibromochroman, etc. Of these 2,4,4-trimethyl-2-(4-hydroxyphenyl)chroman is particularly preferred. All of these compounds may also have halogen or $C_{1-9}$ alkyl substituent groups on the aromatic or the aliphatic rings. These compounds may be used singly or in combination of 2 or more. In the present invention, the residues of these dihydroxy compounds are preferably no more than 50%, most preferably no more than 30%, of the total terminal groups.

The amount of carbonate diesters used should be 1.00~1.30 moles, most preferably 1.01~1.20 moles, per mole of aromatic dihydroxy compounds. The monomers should be made to react in the presence of a catalyst.

The catalyst used may be, for example, one of the compounds proposed by the present applicants in the specification of Japanese Patent Application No. 2-85218. Preferred examples include (a) organic acid salts, inorganic acid salts, oxides, hydroxides, hydrides, or alcoholates of metals such as alkali metals or alkaline-earth metals. Specific examples of such compounds include, but are not limited to, sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium boron hydroxide, lithium boron hydroxide, sodium phenyl borate, sodium benzoate, potassium benzoate, lithium benzoate, disodium hydrogen phosphate, dipotassium hydrogen phosphate, dilithium hydrogen phosphate, the disodium or dipotassium or dilithium salt of bisphenol A, the sodium or potassium or lithium salt of phenol, etc.; calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc. These compounds may be used singly or in combinations of two or more. The amount of such alkali metal compounds and/or alkaline-earth metal compounds used is preferably $10^{-8}$~$10^{-3}$ mole, more preferably $10^{-7}$~$10^{-6}$ mole, most preferably $10^{-7}$~$8\times10^{-7}$ mole, per mole of aromatic dihydroxy compounds.

In addition to these alkali metal compounds and/or alkaline-earth metal compounds, basic compounds (b) may also be used as catalysts. Examples of basic compounds include, but are not limited to, nitrogen compounds such as substituted ammonium hydroxides having alkyl, aryl, or alkaryl groups, e.g., tetramethylammonium hydroxide, tetramethylammonium hydroxide, tetrabutylammonium hydroxide, trimethylbenzylammonium hydroxide, etc.; tertiary amines such as trimethylamine, triethylamine, dimethylbenzylamine, triphenylamine, etc.; secondary or primary amines having methyl, ethyl, or other alkyl groups or phenyl, tolyl, or other aryl groups; ammonia; and basic salts such as tetramethylammonium borohydride, tetrabutylammonium borohydride, tetrabutylammonium tetraphenylborate, tetramethylammonium tetraphenylborate, etc. Of these, the ammonium hydroxides are particularly preferred. These basic compounds may be used singly or in combinations of two or more.

In the present invention, by using as the catalyst a combination of the above-mentioned (a) alkali metal compounds and/or alkaline-earth metal compounds, and (b) nitrogen-containing basic compounds, it is possible to obtain high-molecular-weight polycarbonates with high polymerization activity.

It is also possible to use as the catalyst a combination of (a) alkali metal compounds and/or alkaline-earth metal compounds, (b) nitrogen-containing basic compounds, and (c) boric acid and/or borate esters, When this type of combination is used as the catalyst, the (a) alkali metal compounds and/or alkaline-earth metal compounds are preferably used in the amounts specified above, and the (b) nitrogen-containing basic compounds are preferably used in amounts of $10^{-6} \sim 10^{-1}$ mole, most preferably $10^{-6} \sim 10^{-2}$ mole, per mole of aromatic dihydroxy compounds. The (c) boric acid or borate esters are preferably compounds represented by the following general formula $$B(OR^g)_r(OH)_{3-r}$$

(where $R^9$ is a hydrogen atom, an aliphatic hydrocarbyl group, an alicyclic hydrocarbyl group, or an aromatic hydrocarbyl group, and r is an integer 1~3). Examples include boric acid, trimethyl borate, triethyl borate, tributyl borate, trihexyl borate, triheptyl borate, triphenyl borate, tritolyl borate, trinaphthyl borate, etc. Of these, triphenyl borate is particularly preferred. The amount of (c) boric acid or borate ester used as a catalyst along with the above-mentioned compounds (a) and (b) is preferably $10^{-6} \sim 10^{-1}$ mole, most preferably $10^{-6} \sim 10^{-2}$ mole, per mole of aromatic dihydroxy compounds.

These is no restriction on conditions such as temperature and pressure during the melt polymerization reaction. The usual conditions for known processes can be used. The first-stage reaction is preferably carried out at 80°~250° C., more preferably 100°~230° C., most preferably 120°~190° C., preferably for a period of 0~5 hours, more preferably 0~4 hours, most preferably 0.25~3 hours, at ambient pressure. Then the reaction between the aromatic dihydroxy compounds and the carbonate diesters proceeds as the pressure in the reaction system is reduced and the temperature increased, and finally the reaction between aromatic dihydroxy compounds and carbonate diesters is completed in vacuo, preferably at 0.05~5 mm Hg and 240°~320° C.

The reaction between the types of aromatic dihydroxy compounds and carbonate diesters described above may be carried out continuously or batchwise. The apparatus used for this reaction may be a tank, a tubular reactor, or a reaction column.

Polycarbonates of this sort should preferably have an intrinsic viscosity, measured at 20° C. in methylene chloride, of 0.30~0.65 dL/g, most preferably 0.32~0.62 dL/g, especially if the resin composition is to be used for optical applications. If the intrinsic viscosity is too high, the melt flow of the material will be lowered, making it necessary to mold it at temperatures in excess of 400° C. At such temperatures it would be impossible to avoid decomposition of the resin, which could cause silver streaks or otherwise impair the transparency of the molded products. If the intrinsic viscosity is too low, there may be impairment of properties such as strength and heat resistance, and molding problems such as a tendency to crystallize easily.

The second essential condition in the present invention is that the resin composition contain 0.001~5 wt. parts esters of aliphatic carboxylic acids and alcohols per 100 wt. parts polycarbonates.

There is no particular restriction on the esters of aliphatic carboxylic acids and alcohols; various known esters of this type can be used. Examples include, but are not limited to, esters of saturated or unsaturated aliphatic carboxylic acids, dicarboxylic acids, or tricarboxylic acids with saturated or unsaturated monohydric alcohols such as ethanol or trifluoroethanol, saturated or unsaturated dihydric alcohols such as ethylene glycol or diethylene glycol, saturated or unsaturated trihydric alcohols such as glycerol, saturated or unsaturated tetrhydric alcohols such as pentaerythritol, and saturated or unsaturated polyhydric alcohols having functionality of 5 or more. Note that here "aliphatic carboxylic acids" includes alicyclic carboxylic acids. It is preferably to use esters of aliphatic carboxylic acids represented by the formulas ps $$C_nH_{2n+a}-COOH$$

or $$HOOC-C_nH_{2n}-COOH$$

(where n is an integer 5~34) with alcohols represented by any of the following formulas $$C_{n'}F_{2n'+1}-CH_2OH,$$

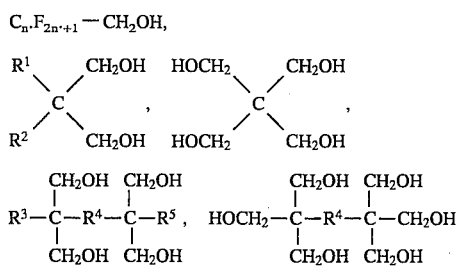

(wherein n° is an integer 1~20; $R^1$ and $R^2$ are each independently an alkyl or substituted alkyl group having 1~10 carbon atoms; or else $R^1$ and $R^2$ are linked to form a 5- or 6-member ring; $R^3$ and $R^5$ are each independently an alkyl or substituted alkyl group having 1~4 carbon atoms; $R^4$ is an alkylene group having 1~4 carbon atoms or else $-(CH_2)_{n'}-O-(CH_2)_{n'}-$, n' being an integer 1~4). Examples of such carboxylic acids include stearic acid, valeric acid, capric acid, caprylic acid, lauric acid, arachic acid, behenic acid, lignoceric acid, cerotic acid, melissic acid, tetratriacontanoic acid, glutaric acid, adipic acid, azelaic acid, etc. Examples of alcohols represented by the above formulas include 2,2-dihydroperfluoropropanol, neopentyl glycol, pentaerythritol, ditrimethylolpropane, dipentaerythritol, etc. It is more preferable to use esters of aliphatic carboxylic acids, with dihydric or polyhydric alcohols. A particularly preferred ester is pentaerythritol tetra-stearate. Of course, one can also use esters having unsaturated bonds, such as pentaerythritol triacrylate or trimethylolpropane trimethacrylate, and esters of aliphatic carboxylic acids with alcohols having aryl or other substituent groups. It is also possible to use a plurality of different esters in accordance with the present invention. The amount of esters used should be 0.001~5 wt. parts preferably 0.01~1 wt. part, per 100 wt. parts of polycarbonates. If the amount of esters used is less than 0.001 wt. part, there will be little improvement in mold release characteristics. On the other hand, if more than 5 wt. parts is used, the mold release characteristics will be improved but the thermal stability and mechanical properties of the composition, in particular its impact strength, will be impaired.

Resin compositions in accordance with the present invention also preferably contain 0.1~10 ppm, most preferably 0.5~5 ppm, of acidic sulfur-containing compounds having a $pK_a$ of 3 or below, or derivatives of such compounds. They make the polycarbonate resin compositions more heat resistant, in particular by inhibiting molecular weight reduction during molding. Any sulfur-containing compound having a $pK_a$ of 3 or below, or derivative thereof, may be used. Preferred compounds include those represented by the following formula

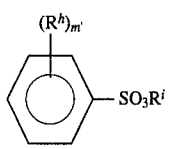

(where $R^h$ is an alkyl group having 1~50 carbons, in which halogen atoms maybe substituted for hydrogen atoms; $R^i$ is a hydrogen atom or an alkyl group having 1~50 carbons, in which halogen atoms may be substituted for halogen atoms; and m' is an integer 0~3). Specific examples of such compounds include, but are not limited to, sulfonic acids such as benzenesulfonic acid and p-toluenesulfonic acid; sulfonic acid esters such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, and phenyl p-toluenesulfonate; and compounds such as trifluoromethanesulfonic acid, naphthalenesulfonic acid, sulfonated polystyrene, methyl acrylate-sulfonated styrene copolymer, etc. It is also possible to use two or more of these compound together. Butyl p-toluenesulfonate is particularly preferred.

Polycarbonate resin compositions in accordance with the present invention may also contain added boron compounds. The boron compounds may be boric acid or borate esters such as those listed previously as catalyst components. Adding such boron compounds can prevent discoloration of the polycarbonate resin composition during molding. The amount of boron compounds added is preferably about 0.00001~0.2 wt. part, most preferably about 0.00005~0.02 wt. part, per 100 wt. parts of polycarbonate. If boron compounds are added as catalyst components during polymerization of the polycarbonate, there is no need to add more after polymerization.

However, if the amount of such boron compounds or acidic sulfur compounds or derivatives used is excessive, the water resistance of the polycarbonate resin composition may be lowered.

Polycarbonate resin compositions in accordance with the present invention may also contain phosphorus compounds or carboxylate esters added as processing stabilizers (antioxidants). Among the phosphorus compounds which may be used are phosphate esters and phosphite esters. Examples of phosphate esters include trialkyl phosphates such as trimethyl phosphate, triethyl phosphate, tributyl phosphate, trioctyl phosphate, tridecyl phosphate, trioctadecyl phosphate, distearyl pentaerythrityl diphosphate, tris(2-chloroethyl) phosphate, and tris(2,3-dichloropropyl) phosphate; tricycloalkyl phosphates such as tricyclohexyl phosphate; and triaryl phosphates such as triphenyl phosphate, tricresyl phosphate, tris(nonylphenyl) phosphate, and 2-ethylphenyl diphenyl phosphate. Examples of phosphite esters include trialkyl phosphites such as trimethyl phosphite, triethyl phosphite, tributyl phosphite, trioctyl phosphite, tris(2-ethylhexyl) phosphite, trinonyl phosphite, tridecyl phosphite, trioctadecyl phosphite, tristearyl phosphite, tris(2-chloroethyl) phosphite, and tris(2,3-dichloropropyl) phosphite; tricycloalkyl phosphites such as tricyclohexyl phosphite; triaryl phosphites such as triphenyl phosphite, tricresyl phosphite, tris(ethylphenyl) phosphite, tris(2,4-di-tert-butylphenyl) phosphite, tris(nonylphenyl) phosphite, and tris(hydroxylphenyl) phosphite; aryl alkyl phosphites such as phenyl didecyl phosphite, diphenyl decyl phosphite, iphenyl isooctyl phosphite, phenyl isooctyl phosphite, and 2-ethylhexyl diphenyl phosphite; as well as distearyl pentaerythrityl diphosphite, bis(2,4-di-tert-butylphenyl)pentaerythrityl diphosphite, and phosphite esters represented by the general formula $$P(OR^j)_3$$

(where each $R^j$ is independently an aliphatic hydrocarbyl group, alicyclic hydrocarbyl group, or aromatic hydrocarbyl group). One can also use hypophosphorous acid, pyrophosphoric acid, polyphosphoric acid, etc. Of these various compounds, phosphite esters are preferred, especially tris(2,4-di-tert-butylphenyl) phosphite. Examples of carboxylate esters, in addition to the compounds previously listed, include but are not limited to n-octadecyl 3-(4'-hydroxy-3', 5'-di-tert-butylphenyl)propionate; various alicyclic diepoxy carboxylates, etc. Two or more stabilizers may be used together. These compounds are preferably used in amounts not exceeding 0.1 wt. part per 100 wt. parts of polycarbonate.

Polycarbonate resin compositions in accordance with the present invention also preferably contain epoxy compounds, so that excess boron compounds or acidic sulfur compounds present in the resin composition will react with the epoxy compounds and be neutralized, making it possible to form moldings having excellent color tone, heat resistance, water resistance, etc. The epoxy compounds used may be any compounds having one or more epoxy groups per molecule. Examples include, but are not limited to, epoxidized soybean oil, epoxidized linseed oil, phenyl glycidyl ether, allyl glycidyl ether, tert-butylphenyl glycidyl ether, 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, 2,3-epoxycyclohexylmethyl 3,4-epoxycyclohexanecarboxylate, 4-(3,4-epoxy-5-methylcyclohexyl)butyl 3,4-epoxycyclohexanecarboxylate, 3,4-epoxycyclohexanecarboxylate, oxide, cyclohexylmethyl 3,4-epoxycyclohexanecarboxylate, 3,4-epoxy-6-methylcyclohexylmethyl 6-methylcyclohexanecarboxylate, bisphenol A diglycidyl ether, tetrabromobisphenol A glycidyl ether, the diglycidyl ester of phthalic acid, the diglycidyl ester of hexahydrophthalic acid, bis(epoxydicyclopentadienyl) ether, bis-epoxyethylene glycol [sic], bis(epoxycyclohexyl) adipate, butadiene diepoxide, tetraphenylethylene epoxide, octyl epoxy talate [sic], epoxidized polybutadiene, 3,4-dimethyl-1,2-epoxycyclohexane, 3,5-dimethyl-1,2-epoxycyclohexane, 3-methyl-5-tert-butyl-1,2-epoxycyclohexane, octadecyl 2,2-dimethyl-3,4-epoxycyclohexanecarboxylate, n-butyl 2,2-dimethyl-3,4-epoxycyclohexanecarboxylate, cyclohexyl 2-methyl-3,4-epoxycyclohexanecarboxylate, n-butyl 2-isopropyl-3,4-epoxy-5-methylcyclohexanecarboxylate, octadecyl 3,4-epoxycyclohexanecarboxylate, 2-ethylhexyl 3',4'-epoxycyclohexanecarboxylate, 4,6-dimethyl 2,3-epoxycyclohexyl 3',4'-epoxycyclohexanecarboxylate, 4,5-epoxytetrahydrophthalic anhydride, 3-tert-butyl-4,5-epoxytetrahydrophthalic anhydride, diethyl 4,5-epoxy-cis-1,2-cyclopentanedicarboxylate, di-n-butyl 3-tert-butyl-4,5-epoxy-cis-1,2-cyclopentanedicarboxylate, etc. These epoxy compounds may be used singly, or in combinations of two or more. There is no particular limitation on the amount of epoxy compounds used, but is is usually preferable to add 0.001~0.1 wt. part, most preferably 0.001~0.08 wt. part, per 100 wt. parts of polycarbonates.

Polycarbonate resin compositions in accordance with the present invention may also contain one or more common additives such as heat stabilizers, weather stabilizers, antistatic agents, slip agents, antiblocking agents, antifogging agent, lubricants, dyes, pigments, natural oils, synthetic oils, waxes, organic fillers, inorganic fillers, etc., in amounts which do not interfere with the object of the present invention.

There is no particular restriction on the method used to combine these components to form resin compositions in accordance with the present invention. The components may be mixed in any order. For example, the esters and any optional components may be added to the molten polycarbonate and kneaded, or the esters and any optional components may be added to a solution of the polycarbonate and later kneaded. More specifically, the molten polycarbonate reaction product obtained on completion of polymerization may be mixed in the reaction vessel or extruder with the esters and any optional components, either one after another or all at once. Or the polycarbonate may be pelletized first, and the pellets then fed to a single-screw or twin-screw extruder along with the esters and any optional components, and melt kneaded. It is also possible to dissolve the polycarbonate in a suitable solvent (e.g., methylene chloride, chloroform, toluene, tetrahydrofuran, etc.), then add the esters and any optional components to the solution, either one after another or all at once, while stirring.

Polycarbonate resin compositions in accordance with the present invention are preferably subjected to a vacuum treatment. There is no particular restriction on the process or equipment used for vacuum treatment. For example, one could use a reactor having a vacuum device, or a vacuum-vented extruder. The reactor having a vacuum pumping device may be either a vertical tank reactor or a horizontal tank reactor, although horizontal tank reactors are preferred. The vacuum-vented extruder may be either a single-screw or a twin-screw extruder, which carries out the vacuum treatment while pelletizing the polymer. If the vacuum treatment is performed in an evacuated reactor vessel, the pressure is preferably lowered to 0.05~750 mm Hg, most preferably 0.05~5 mm Hg. If the vacuum treatment is performed in an extruder, the pressure is preferably lowered to 1~750 mm Hg, most preferably 5~700 mm Hg. This kind of vacuum treatment is preferably performed at 240°~350° C., for a period of 5 minutes to 3 hours in a reactor, or 10 seconds to 15 minutes in an extruder. Performing such a vacuum treatment makes it possible to obtain polycarbonate compositions containing less residual monomers or oligomers. For example, in the case of melt polymerization using diphenyl carbonate as the carbonate diester, vacuum treatment can decrease the amount of residual diphenyl carbonate in the polycarbonate. The polycarbonate should preferably contain no more than 0.1 wt. part, most preferably no more than 0.01 wt. part, of residual diphenyl carbonate.

Resin compositions thus obtained, in accordance with the present invention, show good mold release and thermal stability, with very little discoloration or mold fouling when they are molded.

The present invention will not be described in greater detail by means of some examples, although it is by no means limited to these examples.

DETAILED DESCRIPTION OF THE PREFERRED EMBODIMENTS

Reference Example 1

Synthesis of Polycarbonate (PC1) by Melt Process

A 250-liter stirred tank reactor was filled with 0.44 kilomole of bisphenol A (from Nihon GE Plastics) and 0.44 kilomole of diphenol carbonate (from Eni Co.), then purged with nitrogen, and the contents were melted at 140° C. The temperature was raised to 180° C., 0.011 mole of triphenyl borate was added, and the mixture was stirred for 30 minutes.

Then 0.00044 mole of sodium hydroxide and 0.11 mole of tetramethylammonium hydroxide were added as catalysts, and stirring was continued for 30 minutes, after which the temperature was raised to 210° C. as the pressure was gradually lowered to 200 mm Hg. After 30 minutes, the temperature was increased to 240° C. and the pressure gradually lowered to 15 mm Hg. The temperature and pressure were then kept constant, and the amount of phenol distilled off was measured. When phenol stopped distilling off, the reactor was pressurized with nitrogen to atmospheric pressure. The time required for the reaction was 1 hour.

The intrinsic viscosity ($\eta$) of the reaction product was 0.15 dL/g.

The reaction product was then fed by a gear pump to a centrifugal thin-film evaporator for further reaction. The evaporator temperature and pressure were controlled at 270° C. and 2 mm Hg. A gear pump was used to feed the product from the bottom of the evaporator at a rate of 40 kg/hr to a horizontal twin-impeller stirred tank (L/D=3), impeller blade diameter 220 mm, capacity 80 liters), where polymerization was continued at 290° C. and 0.2 mm Hg, with a residence time of 30 minutes.

The molten polymer was then fed by a gear pump to a twin-screw extruder (L/D=17.5, barrel temperature 285° C.), to which 2 ppm of butyl p-toluenesulfonate was added and kneaded into the polymer. The resulting polymer was extruded through a die to form a strand, and cut into pellets.

The intrinsic viscosity (IV) of the polymer thus obtained was 0.49 dL/g.

Reference Example 2

Synthesis of Lower-Viscosity Polycarbonate (PC3) by Melt Process

A reaction product obtained as in the first part of Reference Example 1, having intrinsic viscosity ($\eta$) 0.15 dL/g, was fed by a gear pump to a centrifugal thin-film evaporator for further reaction. The evaporator temperature and pressure were controlled at 270° C. and 2 mm Hg. A gear pump was used to feed the product from the bottom of the evaporator at a rate of 40 kg/hr to a horizontal stirred tank with twin impellers (L/D=3, impeller blade diameter 220 mm, capacity 80 liters) where polymerization was continued at 280° C. and 0.2 mm Hg, with a residence time of 30 minutes.

The molten polymer was then fed by a gear pump to a twin-screw extruder (L/D=17.5, barrel temperature 285° C.), to which 2 ppm of butyl p-toluenesulfonate was added and kneaded into the polymer, which was extruded through a die to form a strand, and cut into pellets.

The intrinsic viscosity (IV) of the polymer thus obtained was 0.345 dL/g.

Examples 1~2, Comparisons 1~4

The following components were combined in the proportions shown in Table 1, mixed in a single-screw extruder (L/D=17.5, temperature 280° C.), and pelletized.
PC1: polycarbonate obtained in Reference Example 1
PC2: polycarbonate made from bisphenol A by phosgene process (intrinsic viscosity 0.50 dL/g)
PETS: pentaerythritol tetrastearate
TSF437®: silicon oil, from Toshiba Silicone Stabilizers:

Stb1: tris(2,4-di-tert-butylphenyl) phosphite [MK 2112E®, from Adeka Argus]

Stb2: n-octadecyl 3-(4'-hydroxy-3', -5'-di-tert-butylphenyl)propionate

Stb3: alicyclic diepoxy carboxylate [Celloxide 2021P®, from Daicel]

The resulting pellets were fed to a single-screw extruder (L/D=28, temperature 280° C.), then to a 150-t injection-molding machine (cylinder temperature 280° C., mold temperature 80° C.) to form moldings (150 mm high, 80 mm wide, 70 mm thick).

The moldings thus obtained were evaluated as follows.

Ejector Pin Force (kg,) (mean, n=10): The force applied by the ejector pin, measured during ejection of the moldings Deformation by Ejector Pin: Each molding was examined visually for deformation at the point where the ejector pin struck it.

Mold Fouling (after 10,000 shots): The polished surfaces of the mold were examined visually for fouling after continuous molding of 3-mm plates (cylinder temperature 290° C., injection pressure 1000 kg/cm$^2$, cycle time 45 sec, mold temperature 90° C.) for a total of 10,000 shots Initial YI (Yellowness Index): The X, Y, and Z values of the 3-mm plates (molded at cylinder temperature 290° C., injection pressure 1000 kg/cm$^2$, cycle time 45 sec, mold temperature 90° C.) were measured by the transmission method using an ND-1001 DP Color and Color Difference Meter (from Nippon Denshoku Kogyo), and the yellowness index was calculated using the formula YI=100X (1.277X-1.606Z)/Y YI After 15 Minutes at 320° C. ("320-15 YI" in Table 1): Injection moldings were prepared as above, except that the cylinder temperature was 320° C. and the composition was held in the cylinder for 15 minutes before injection, then the YI of the moldings was determined as above.

Initial MI (melt index): The melt index of the pelletized composition was measured by the JIS K-7210 standard method, at 300° C. with a load of 1.2 kg.

MI After 15 Minutes at 320° C. ("320-15 MI" in Table 1): Measured as for the initial MI, using plates molded after holding up the resin for 15 minutes at 320° C. as described above The results are shown in Table 1.

TABLE 1

| Experiment* | Ex. 1 | Ex. 2 | Co. 1 | Co. 2 | Co. 3 | Co. 4 |
|---|---|---|---|---|---|---|
| Composition |  |  |  |  |  |  |
| PC1 | 100 | 100 | — | — | 100 | 100 |
| PC2 | — | — | 100 | 100 | — | — |
| PETS | 0.3 | 0.6 | 0.3 | 0.6 | — | — |
| TSF437 | — | — | — | — | — | 0.3 |
| Stb1 | 0.03 | 0.03 | 0.03 | 0.03 | 0.03 | 0.03 |
| Stb2 | 0.03 | 0.03 | 0.03 | 0.03 | 0.03 | 0.03 |
| Stb3 | 0.03 | 0.03 | 0.03 | 0.03 | 0.03 | 0.03 |
| Characteristic |  |  |  |  |  |  |
| Ejector Pin Force | 740 | 635 | 750 | 630 | 980 | 878 |
| Deformation by Ejector Pin | none | none | none | none | much | much |
| Mold Fouling After 10,000 Shots | none | none | some | some | none | some |
| Initial YI | 1.8 | 1.8 | 1.8 | 1.9 | 1.7 | 1.8 |
| 320-15 YI | 1.8 | 1.9 | 2.3 | 2.5 | 1.7 | 1.8 |
| Initial MI | 10.6 | 11.0 | 10.3 | 11.0 | 10.4 | 10.7 |
| 320-15 MI | 11.0 | 11.5 | 13.9 | 14.3 | 11.0 | 11.6 |

TABLE 1-continued

| Experiment* | Ex. 1 | Ex. 2 | Co. 1 | Co. 2 | Co. 3 | Co. 4 |
|---|---|---|---|---|---|---|

*Ex. → Example, Co. → Comparison

Examples 3–4 Comparisons 5–7

The following components were combined in the proportions shown in Table 2, and used to mold compact disks (CDs) 120 mm in diameter using a nickel stamper, with a cylinder temperature of 350° C., a cycle time of 7 seconds, and a mold temperature of 80° C., in a continuous operation for 24 hours.

PC3: polycarbonate obtained in Reference Example 2

PC4: polycarbonate made from bisphenol A by phosgene process (intrinsic viscosity 0.357 dL/g)

PETS

Stb1

Stb3

The resulting CDs were tested for the following characteristics.

Continuous Production Quality: Noted whether problems occurred during the continuous production run Stamper Fouling at 24 hours: After producing CDs continuously as described above for 24 hours, the stamper was examined visually for fouling The results are shown in Table 2.

TABLE 2

| Experiment[1] | Ex. 3 | Ex. 4 | Co. 5 | Co. 6 | Co. 7 |
|---|---|---|---|---|---|
| Composition |  |  |  |  |  |
| PC3 | 100 | 100 | — | — | 100 |
| PC4 | — | — | 100 | 100 | — |
| PETS | 0.1 | 0.3 | 0.1 | 0.3 | — |
| Stb1 | 0.01 | 0.01 | 0.01 | 0.01 | 0.01 |
| Stb3 | 0.01 | 0.01 | 0.01 | 0.01 | 0.01 |
| Characteristic |  |  |  |  |  |
| Suitability for Continuous Production | OK | OK | OK | OK | NG[2] |
| Stamper Fouling After 24 Hours | none | none | some | much | — |

[1]Ex. → Example, Co. → Comparison
[2]Continuous production impossible due to problems caused by poor mold release (disk sticking in mold, etc.)

As can be seen from the examples, resin compositions in accordance with the present invention show better mold release and thermal stability, and consequently less mold fouling and better continuous production characteristics, than compositions having as their main component polycarbonate resins obtained by the phosgene process. Resin compositions in accordance with the present invention also have the advantage of showing very little discoloration during molding.

What is claimed is:

1. A polycarbonate resin composition comprising:

A) 100 parts by weight of a polycarbonate having an intrinsic viscosity, as measured at 20 C. in methylene chloride, of from 0.30 to 0.65 dL/g and B) 0.001–5 parts by weight of an ester of an aliphatic carboxylic acid and an alcohol, in which the polycarbonate is a product of melt polymerization of an aromatic dihydroxy compound with a carbonate diester.

2. A polycarbonate resin composition of claim 1 wherein the ester of an aliphatic carboxylic acid and alcohol is an ester of an aliphatic carboxylic acid with a polyhydric alcohol.

3. A polycarbonate resin composition of claim 2, further comprising 0.1–10 ppm of an acid sulfur-containing compound having a pKa of 3 or less, or a derivative formed from such a compound.

4. A polycarbonate resin composition of claim 3, wherein the sulfur-containing compound is butyl p-toluenesulfonate.

5. A polycarbonate resin composition of claim 4, wherein the polycarbonate is a product of melt polymerization of an aromatic dihydroxy compound with a carbonate diester in the presence of $10^{-8}$–$10^{-3}$ mole of an alkali metal or alkaline-earth metal compound per mold of aromatic dihydroxy compounds.

6. A melt-polymerized polycarbonate resin composition comprising
   (A) a polycarbonate having an intrinsic viscosity, as measured at 20° C. in methylene chloride of from 0.30 to 0.65 dL/g, made by the melt polymer process, and
   (B) an ester of an aliphatic carboxylic acid and an alcohol whereby the composition has good mold release and thermal stability.

7. A polycarbonate resin composition of claim 5 wherein said polycarbonate comprises 100 parts by weight per 0.001–5 parts by weight of said ester.

8. A process for preparing a resin composition comprising
   melt-polymerizing from an aromatic dihydroxy compound with a carbonate diester in the presence of alkali metal or alkaline-earth metal compound a polycarbonate having an intrinsic viscosity, as measured at 20° C. in methylene chloride, of from 0.30 to 0.65 dL/g, vacuum-treating the polycarbonate at a temperature of from 240° to 350° C. under a vacuum of from 0.05 to 750 mm Hg for a period of from 10 seconds to 3 hours and mixing the polycarbonate with an ester of an aliphatic carboxylic acid and an alcohol whereby the composition has good mold release and thermal stability.

9. A process of claim 8 wherein the polycarbonate is vacuum treated in an extruder under a vacuum of from 1 to 750 mm Hg for a period of from 10 seconds to 15 minutes.

10. A process of claim 8 wherein the polycarbonate is vacuum treated in a reactor vessel under a vacuum of from 0.05 to 750 mm Hg for a period of from 5 minutes to 3 hours.

\* \* \* \* \*